US008954846B2

(12) United States Patent
Sato

(10) Patent No.: US 8,954,846 B2
(45) Date of Patent: Feb. 10, 2015

(54) COMMUNICATION APPARATUS AND STORAGE MEDIUM STORING PROGRAM

(75) Inventor: Shoji Sato, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 584 days.

(21) Appl. No.: 12/623,050

(22) Filed: Nov. 20, 2009

(65) Prior Publication Data

US 2010/0169762 A1    Jul. 1, 2010

(30) Foreign Application Priority Data

Dec. 26, 2008   (JP) .................................. 2008-332250

(51) Int. Cl.
    *G06F 17/00*      (2006.01)
    *G06F 17/21*      (2006.01)
    *G06F 17/22*      (2006.01)

(52) U.S. Cl.
    CPC ............ *G06F 17/21* (2013.01); *G06F 17/2247* (2013.01)
    USPC ............ 715/273; 715/243; 715/274; 358/462

(58) Field of Classification Search
    USPC ........................... 715/243, 273, 274; 358/462
    See application file for complete search history.

(56) References Cited

U.S. PATENT DOCUMENTS

| | | | |
|---|---|---|---|
| 6,195,655 B1 * | 2/2001 | Lawler ................................... 1/1 |
| 6,807,676 B1 * | 10/2004 | Robbins et al. .................. 725/39 |
| 8,102,544 B2 * | 1/2012 | Yoshimura et al. ........... 358/1.11 |
| 2004/0225749 A1 * | 11/2004 | Pavlik et al. ................... 709/245 |
| 2006/0129917 A1 * | 6/2006 | Volk et al. ...................... 715/513 |
| 2006/0259499 A1 * | 11/2006 | Moulckers et al. ............ 707/100 |
| 2007/0019222 A1 * | 1/2007 | Oda et al. ...................... 358/1.13 |
| 2007/0061711 A1 * | 3/2007 | Bodin et al. ................... 715/523 |

(Continued)

FOREIGN PATENT DOCUMENTS

| | | | |
|---|---|---|---|
| JP | H09-093411 A | 4/1997 |
| JP | 2001-318925 A | 11/2001 |

(Continued)

OTHER PUBLICATIONS

Impress Corporation, http://www.forestimpress.co.jp/article/2004/05/26/dirtynewsreader.html Website page entitled, "Dirty News Reader," dated May 26, 2004.

(Continued)

*Primary Examiner* — Stephen Hong
*Assistant Examiner* — Matthew Ludwig
(74) *Attorney, Agent, or Firm* — Baker Botts L.L.P.

(57) ABSTRACT

A communication apparatus including: a positional information storing portion which stores positional information of content-related information; a content-related-information obtaining portion which obtains the content-related information; a web-page generating portion which generates, using the content-related information, a web page including first information; a web-page storing portion which has a storage device store the web page, the storage device being accessible from an external device; an assigning portion which assigns web-page positional information to the web page such that the external device is allowed to access to the web page; a recording-page generating portion which generates a recording page on which is described second information; a positional-information adding portion which adds the web-page positional information to the recording page; and a recording controller which controls a recording section configured to perform recording on a recording medium, such that the recording section records the recording page.

21 Claims, 6 Drawing Sheets

(56) References Cited

U.S. PATENT DOCUMENTS

| | | | |
|---|---|---|---|
| 2007/0174298 A1* | 7/2007 | Tanimoto | 707/10 |
| 2007/0180381 A1* | 8/2007 | Rice et al. | 715/711 |
| 2007/0229885 A1 | 10/2007 | Kimura | |
| 2007/0294646 A1* | 12/2007 | Timmons | 715/864 |
| 2008/0147653 A1* | 6/2008 | Collier | 707/6 |
| 2008/0165209 A1 | 7/2008 | Kondo et al. | |
| 2008/0172370 A1* | 7/2008 | Farouki | 707/5 |
| 2008/0209483 A1* | 8/2008 | Lemmers et al. | 725/105 |

FOREIGN PATENT DOCUMENTS

| | | |
|---|---|---|
| JP | 2001-331660 A | 11/2001 |
| JP | 2006-092165 A | 4/2006 |
| JP | 2006-221228 A | 8/2006 |
| JP | 2007-115137 A | 5/2007 |
| JP | 2007-122513 A | 5/2007 |
| JP | 2007-148486 A | 6/2007 |
| JP | 2007-274209 A | 10/2007 |
| JP | 2008-165692 A | 7/2008 |

OTHER PUBLICATIONS

Japan Patent Office; Notification of Reason for Refusal for Patent Application No. 2008-332250, mailed Oct. 26, 2010. (counterpart to above-captioned U.S. patent application).

* cited by examiner

FIG.2

| USER NAME | CONTENT DISTRIBUTION SERVER NAME | WEB-PAGE DESCRIBED ITEM | WEB-PAGE DESCRIBING NUMBER | MAXIMUM RECORDING NUMBER |
|---|---|---|---|---|
| ICHIRO | ·90<br>·91 | ·CONTENT-TITLE CHARACTER STRING<br>·CONTENT-ABSTRACT CHARACTER STRING | 100 | 2 |
| HANAKO | ·90 | ·CONTENT-TITLE CHARACTER STRING<br>·CONTENT-ABSTRACT CHARACTER STRING<br>·CONTENT-UPDATED DATE AND TIME INFORMATION | 50 | 1 |

20b

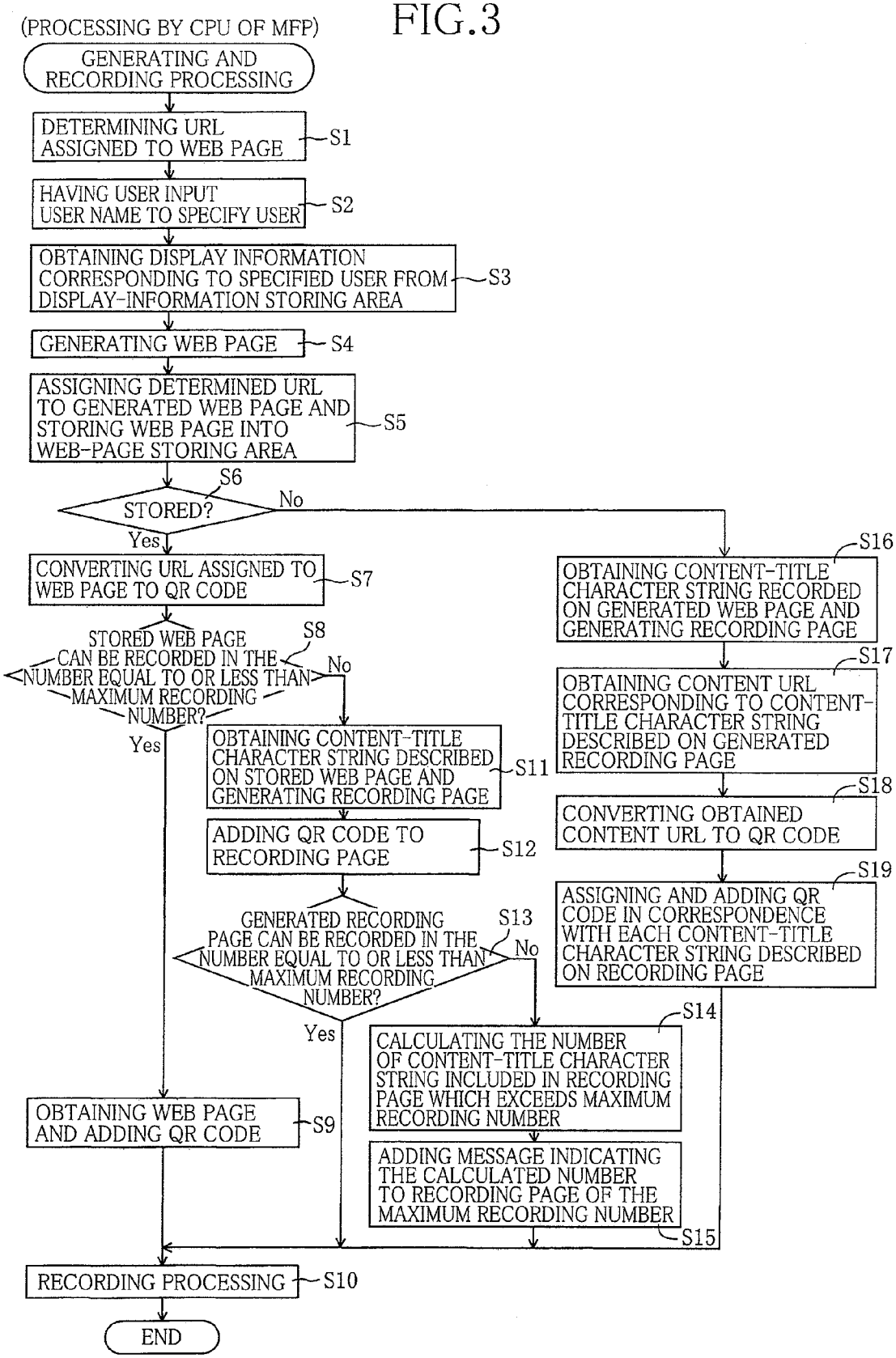

FIG.5

| USER NAME | CONTENT DISTRIBUTION SERVER NAME | WEB-PAGE DESCRIBED ITEM | WEB-PAGE DESCRIBING NUMBER | RECORDING-PAGE DESCRIBED ITEM | RECORDING-PAGE DESCRIBING NUMBER | MAXIMUM RECORDING NUMBER (WEB PAGE) | MAXIMUM RECORDING NUMBER (RECORDING PAGE) |
|---|---|---|---|---|---|---|---|
| ICHIRO | •90 •91 | •CONTENT-TITLE CHARACTER STRING •CONTENT-ABSTRACT CHARACTER STRING | 100 | •CONTENT-TITLE CHARACTER STRING | 50 | 3 | 2 |
| HANAKO | •90 | •CONTENT-TITLE CHARACTER STRING •CONTENT-ABSTRACT CHARACTER STRING •CONTENT-UPDATED DATE AND TIME INFORMATION | 50 | •CONTENT-TITLE CHARACTER STRING •CONTENT-ABSTRACT CHARACTER STRING •CONTENT-UPDATED DATE AND TIME INFORMATION | 50 | 2 | 2 |

20b

COMMUNICATION APPARATUS AND STORAGE MEDIUM STORING PROGRAM

CROSS REFERENCE TO RELATED APPLICATION

The present application claims priority from Japanese Patent Application No. 2008-332250, which was filed on Dec. 26, 2008, the disclosure of which is herein incorporated by reference in its entirety.

BACKGROUND OF THE INVENTION

1. Field of the Invention

The present invention relates to a communication apparatus and a storage medium storing a program.

2. Description of the Related Art

Various contents are published on a network. There is a server on which is published content-related information including a title of each content and a Uniform Resource Locator (URL) of the content. As an example of the content-related information, there is feeding information (Feed), for example. A format of the feeding information includes RSS and Atom, for example. In the conventional technique, there is a software for accessing to a URL of the server and obtaining the feeding information from the server to generate and display a title of each content.

SUMMARY OF THE INVENTION

Where the software in the conventional technique is applied to a Multifunction Peripheral (MFP) having a printer function and a scanning function, information relating to the content (e.g., a title of the content, an abstract of the content, a date and time at which the content is updated, an URL of the content, or the like) is displayed and scrolled on a display device. Thus, where a user wants to check a relatively large amount of information relating to the content, there is a problem in which the user has to wait for a long time by continuing to view the display device, for example, until all the information relating to the content has been scrolled (that is, until all the information has been displayed so as to be successively changed).

Further, even if the information relating to the content can be displayed in a fixed display on the display device of the MFP without a need of the scrolling, information which can be displayed on the display device at a time is limited because a displaying area of the display device is relatively narrow or small. Thus, if the user wants to check the relatively large amount of the information relating to the content, the user has to check fragments of the information relating to the content by changing the fixed display successively. Thus, if the user wants to check the relatively large amount of the information relating to the content, there is a problem in which the user has to change the display, for example, for a long time until all the information relating to the content has been displayed.

This invention has been developed to solve the above-described problems, and it is an object of the present invention to provide a communication apparatus and a storage medium storing a program which can have a user check a relatively large amount of information relating to a content in a relatively short time.

The object indicated above may be achieved according to the present invention which provides a communication apparatus including: a positional information storing portion configured to store positional information which is positional information of content-related information including at least positional information of a content and title information of the content; a content-related-information obtaining portion configured to obtain the content-related information by using the positional information stored in the positional information storing portion; a web-page generating portion configured to generate, using the content-related information obtained by the content-related-information obtaining portion, a web page including first information constituted by information included in the content-related information; a web-page storing portion configured to have a storage device store the web page generated by the web-page generating portion, the storage device being accessible from an external device; an assigning portion configured to assign web-page positional information to the web page such that the external device is allowed to access to the web page stored in the storage device; a recording-page generating portion configured to generate a recording page on which is described second information including at least part of the first information described on the web page generated by the web-page generating portion; a positional-information adding portion configured to add the web-page positional information assigned to the web page by the assigning portion, to the recording page generated by the recording-page generating portion; and a recording controller configured to control a recording section configured to perform recording on a recording medium, such that the recording section records the recording page to which the web-page positional information is added by the positional-information adding portion.

The object indicated above may be achieved according to the present invention which provides a storage medium storing a program executed by a communication apparatus, the program including: obtaining content-related information by using positional information stored in a positional information storing portion; generating, by using the content-related information, a web page including first information constituted by information included in the content-related information; storing the web page into a storage device accessible from an external device; assigning web-page positional information to the web page such that the external device is allowed to access to the web page stored in the storage device; generating a recording page on which is described second information including at least part of the first information; adding the web-page positional information to the recording page; and controlling a recording section configured to perform recording on a recording medium, such that the recording section records the recording page.

BRIEF DESCRIPTION OF THE DRAWINGS

The objects, features, advantages, and technical and industrial significance of the present invention will be better understood by reading the following detailed description of an embodiment of the invention, when considered in connection with the accompanying drawings, in which:

FIG. 2 is a view showing an example of a content of a setting file;

FIG. 3 is a flow-chart indicating a generating and recording processing performed by a CPU of an MFP;

FIG. 5 is a view showing another example of the content of the setting file.

DESCRIPTION OF THE EMBODIMENT

Hereinafter, there will be described an embodiment of the present invention by reference to the drawings. An MFP system 2 includes a Multifunction Peripheral (MFP) 10, a plurality of cellular phones (hereinafter, each abbreviated as "CP") 70, 71, and a plurality of contents distribution servers 90, 91. It is noted that, in FIG. 1, only the one MFP 10, the two CPs 70, 71, and the two contents distribution servers 90, 91 are shown, but the numbers of these components may be changed as needed.

Figure 1:
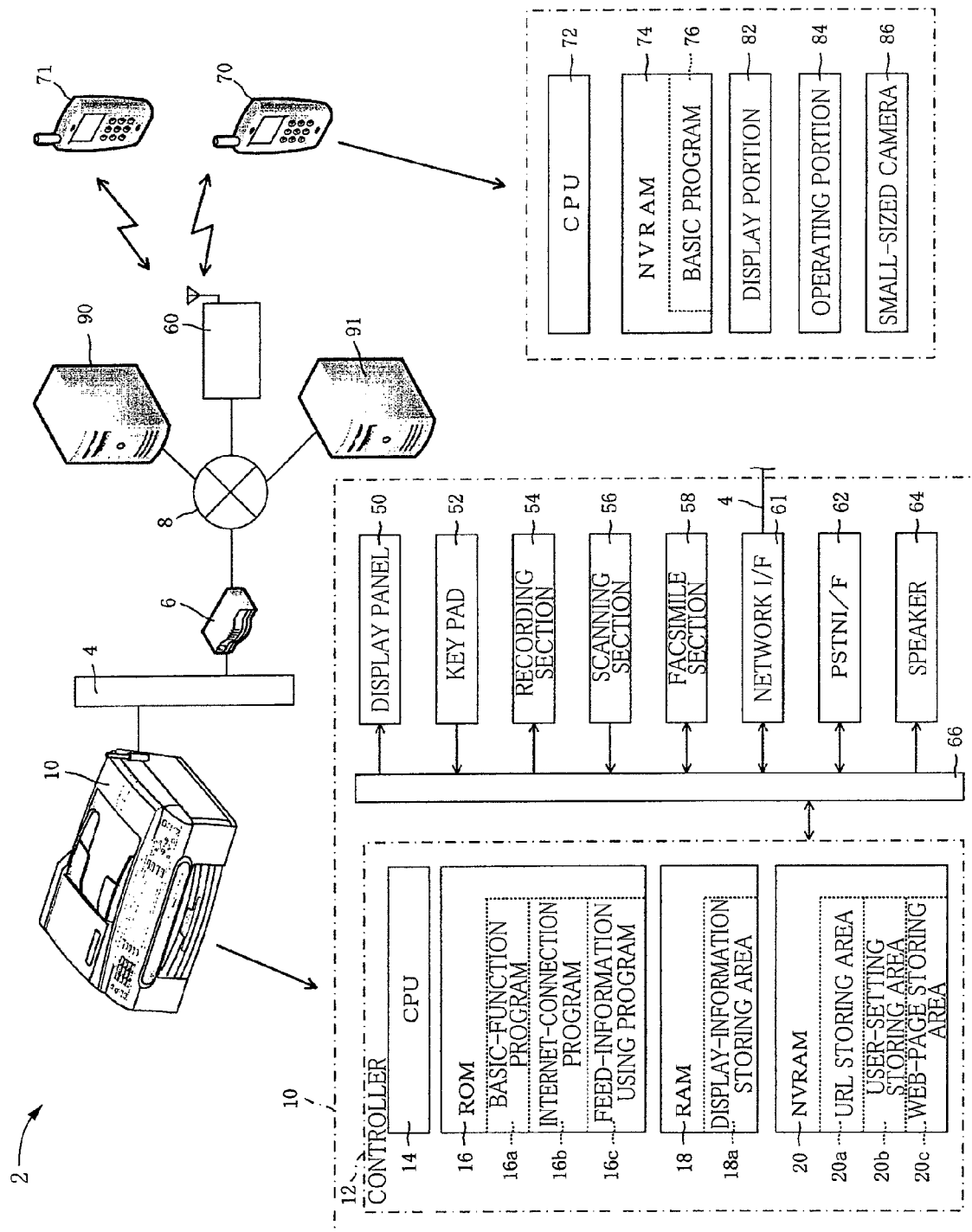
FIG. 1 is a view generally showing an MFP system in an embodiment of the present invention.

The MFP 10 shown in FIG. 1 is a communication apparatus having, e.g., a recording function, a scanning function, and a phone function, and connected to a LAN line 4. The LAN line 4 is connected to an internet 8 via a router 6. Each of the CPs 70, 71 is configured to be accessible to the MFP 10 via a base station 60 connected to the internet 8.

Each of the contents distribution servers 90, 91 is connected to the internet 8. In the present embodiment, the contents distribution server 90 publishes one site while the contents distribution server 91 publishes another site. Each site includes a plurality of contents. Further, each of the contents distribution servers 90, 91 stores feeding information (feeding information in RSS format) which is information relating to the plurality of contents included in the site of each server.

The MFP 10 mainly includes a controller 12, a display panel 50, a key pad (receiving portion) 52, a recording section 54, a scanning section 56, a facsimile section 58, a network interface (hereinafter, may be referred to as "network I/F") 61, a PSTN interface (hereinafter, may be referred to as "PSTN I/F") 62, and a speaker 64. It is noted that the controller 12 and each of the components or sections 50-64 are connected to each other via a bus line 66. The controller 12 mainly includes a CPU 14, a ROM 16, a RAM 18, and an NVRAM 20.

The CPU 14 is a computing device which performs or executes processings in accordance with each of programs 16a, 16b stored in the ROM 16. The ROM 16 is a nonvolatile unwritable memory which stores the programs 16a, 16b, and a program 16c.

The basic-function program 16a is a program for controlling basic operations of the MFP 10. The basic-function program 16a includes programs for generating information for display on the display panel 50 (which information may be hereinafter referred to as "display information"), for example. Further, the basic-function program 16a includes programs for controlling the components or sections 50-64 such as the recording section 54, the scanning section 56, and the facsimile section 58, for example.

The Internet-connection program (content-related-information obtaining portion) 16b is a program for obtaining the feeding information (content-related information) distributed by the contents distribution servers 90, 91 by being periodically connected to the internet 8 (for example, on a daily basis).

The feed-information using program 16c is a program which performs a processing for analyzing the feeding information obtained from the contents distribution servers 90, 91 to generate the display information and displaying the generated display information when a user boots up the MFP 10 by operating the key pad 52. It is noted that the generated display information is stored into a display-information storing area 18a which will be described below. The feed-information using program 16c assigns a source of the feeding information, i.e., a name of the contents distribution server to the generated display information. Thus, the CPU 14 can identify which contents distribution server has distributed the display information.

The display information includes update-content information which is updated each time when the display information is generated. The number of sets of the update-content information is equal to the number of the contents included in the site published by the contents distribution server. For example, where the site published by the contents distribution server 90 includes sports and news, the sets of the update-content information included in the display information corresponding to the contents distribution server 90 are two sets of information, namely, information corresponding to the sports and information corresponding to the news.

The update-content information includes a content-title character string, content-updated date and time information, a content-abstract character string, and a content URL. The content-title character string is a character string of a title of the content. The content-updated date and time information is information about a date and time (the latest update date and time) at which the content is updated in the contents distribution servers 90, 91. The content-abstract character string is an abstract of the character string included in the content. Specifically, the content-abstract character string is a character string having more characters than the content-title character string but having less characters than an entirety of the content, and is a character string in which information about the content is summarized. The content URL is a URL indicating positional information of the content.

The RAM 18 is a volatile writable and readable memory having the display-information storing area 18a. The display-information storing area 18a is a storing area which stores the display information generated by the feed-information using program 16c using the feeding information.

The NVRAM 20 is a nonvolatile rewritable memory having storing areas 20a-20c. The URL storing area 20a is a storing area for storing an URL indicating an address (the positional information) of the source of the feeding information included in each of the contents distribution servers 90, 91. In other words, the URL storing area 20 stores positional information which is the address of the feeding information including at least the positional information of the content and the title information of the content.

For example, the user needs to set the URL in order to receive a content distributing service from each of the contents distribution servers 90, 91. This URL setting can be performed on a site setting display (not shown) displayed on the display panel 50. When the URL indicating the address of the source of the feeding information of each of the contents distribution servers 90, 91 is set on the site setting display by the user using the key pad 52, the set URL is stored into the URL storing area 20a.

It is noted that the URL setting may be performed using the CPs 70, 71 instead of the site setting display. For example, when the user sets the URL in order to receive the content distributing service from the contents distribution server 90 by using the CP 70, the URL indicating the address of the source of the feeding information of the contents distribution server 90 is outputted from the CP 70 to the MFP 10. In this case, the MFP 10 may be configured such that the URL indicating the address of the source of the feeding information of the contents distribution server 90 is stored into the URL storing area 20a.

The user-setting storing area 20b is a storing area storing a setting file (information about the content-related information) in which information described or listed on (a) a web page (with reference to FIG. 4E) stored in the web-page storing area 20c and (b) recording pages (with reference to any of FIGS. 4A-4D) corresponding to the web page is set for each user. It is noted that the web page and the recording pages are generated by the CPU 14 using the setting file stored in the user-setting storing area 20b and the display information stored in the display-information storing area 18a. It is noted that the web page is a collection of data displayed on a web browser while each of the recording pages is a collection of data based on which recording is performed on a recording sheet or recording sheets at one recording command.

The web-page storing area (storing device) 20c is a storing area which stores the web page generated by the CPU 14. The web page stored in the web-page storing area 20c is published to the CPs 70, 71 having accessed to the MFP 10. A detail of the web page will be explained with reference to FIG. 4E.

The display panel 50 is a display device which displays various information. The display panel 50 has a relatively small display area, so that information included in the display information (for example, the content-title character string) is displayed in one line so as to be successively changed (i.e., scroll display of the information is performed), thereby displaying all information included in the display information. It is noted that, instead of the scroll display, two or three sets of the information included in the display information (for example, the content-title character string) can be displayed in a fixed display on the display panel 50, for example, but an amount of the information (information amount) which can be displayed by this one fixed display is greatly smaller than an information amount of the web page stored in the web-page storing area 20c and an information amount of the recording page(s) recorded on the recording sheet(s). It is noted that, in the present embodiment, all the information included in the display information is displayed on the display panel 50 by scrolling the information included in the display information, but the MFP 10 may be configured such that part of the information included in the display information is displayed in the fixed display on the display panel 50, and the fixed display is successively changed by the operation with the key pad 52, thereby displaying all the information included in the display information on the display panel 50.

The key pad 52 includes a plurality of keys. The user can input various commands and information to the MFP 10 by operating the key pad 52. The recording section 54 includes a recording mechanism of, e.g., ink-jet type and laser type and records the generated recording page(s) on the recording sheet(s), for example. The scanning section 56 includes a reading mechanism such as a CCD and a CIS. The facsimile section 58 performs various operations for performing a facsimile communication. The network interface 61 is connected to the LAN line 4. Thus, the MFP 10 is accessible to the internet 8.

There will be explained an internal structure of the CP 70. It is noted that the CP 71 has the same internal structure as the CP 70, and an explanation of which is dispensed with. The CP 70 mainly includes a CPU 72, an NVRAM 74, a display portion 82, an operating portion 84, and a small-sized camera 86.

The CPU 72 is a computing device which performs processings in accordance with a basic program 76. The NVRAM 74 stores the basic program 76. The basic program 76 is a program for controlling basic operations of the CP 70. The basic program 76 includes a browser for downloading the content from a site of the internet 8 and displaying the content, for example. The display portion 82 is a display device for displaying various information. The operating portion 84 includes a key board and a mouse. The small-sized camera 86 is a device which can take pictures of various information.

There will be next explained, with reference to FIG. 2, the setting file stored in the user-setting storing area 20b (with reference to FIG. 1). The setting file includes information used for generating the web page and the recording page(s). Specifically, the setting file includes a user name, a content distribution server name, a web-page described item, a web-page describing number, and a maximum recording number.

The user name represents a name of the user who has set the setting file. In FIG. 2, the users having set the setting file are "Ichiro" and "Hanako". It is noted that the user set in the setting file is allowed to command the generation of the web page and the recording page(s) (which may be hereinafter referred to as "generating command").

The content distribution server name represents the name of the contents distribution server of the information used for generating the web page and the recording page(s). For example, where the user having performed the generating command is "Ichiro", the CPU 14 determines, as the name of the contents distribution server of the information to be used for generating the web page and the recording page(s), the name of the contents distribution server of the information obtained from "the contents distribution servers 90, 91". Then, the CPU 14 narrows the information used for the web page and the recording page(s) from the display information to the update-content information.

The web-page described item represents information described on the web page, which information is part of information included in the narrowed update-content information. Up to three sets of information (i.e., the content-title character string, the content-updated date and time information, and the content-abstract character string) included in the update-content information can be set to the web-page described item. For example, where the user having performed the generating command of the web page is "Ichiro", the information described on the web page is "the content-title character string" and "the content-abstract character string" of the narrowed update-content information. It is noted that, in the present embodiment, regardless of the setting of the web-page described item, the content URL included in the narrowed update-content information is automatically described on the web page to be generated.

The web-page describing number represents the maximum describing number that is the number of sets of the information to be described on the web page. For example, where the user having performed the generating command of the web page is "Ichiro", up to one hundred sets of information can be described on the web page with a set of "the content-title character string" and "the content-abstract character string" being as one set of information.

The maximum recording number represents the maximum number of recording sheets which can be used in the recording of the recording page and also represents the maximum number of recording sheets which can be used in the recording of the web page. For example, where the user having performed the generating command of the web page is "Ichiro", the maximum number of the recording sheets which can be used in the recording of the web page is two.

As described above, since the various settings can be changed for each user using the MFP 10 by using the setting file stored in the user-setting storing area 20b, the information to be described on the web page can be arranged for each user.

There will be next explained, with reference to FIG. 3, a generating and recording processing which is performed or executed by the CPU 14 of the MFP 10. It is noted that the generating and recording processing is a processing performed when the generation and recording of the web page and the recording page(s) are commanded by the user operating the key pad 52.

In the generating and recording processing, initially in S1, the CPU 14 determines an URL assigned to the web page to be generated such that the web page is published for the CPs 70, 71 having accessed to the MFP 10. It is noted that, where the generating and recording processing is performed by a plurality of users, the web page to be generated is changed depending upon each user, and thus the CPU 14 determines in S1 the URL assigned to the web page each time when the generating and recording processing is performed. However, where the generating and recording processing is performed by only one user, the web page previously generated may be overwritten with the web page to be generated at this time. Thus, in this case, the CPU 14 may skip or omit the processing of S1. It is noted that the judgment as to whether the generating and recording processing is performed by one user or not can be performed by the CPU 14 referring to the user name of the setting file stored in the user-setting storing area 20b.

Next in S2, the CPU 14 has the user input the user name to specify the user performing the generating and recording processing. Then, in S3, the CPU 14 obtains the display information corresponding to the specified user from the display-information storing area 18a. Specifically, in S3, the CPU 14 specifies the display information corresponding to the specified user from the web-page described item of the setting file stored in the user-setting storing area 20b, and obtains the specified display information from the display-information storing area 18a.

Next, in S4, the CPU 14 generates the web page by using the obtained display information. Specifically, in S4, the CPU 14 checks or recognizes the web-page described item and the web-page describing number set by the user specified in S2, and extracts, on the basis of this checking, information used for generating the web page from the update-content information included in the display information obtained in S3. Then, in S4, the CPU 14 generates the web page by using the extracted information.

After the processing of S4, the CPU 14 assigns in S5 the URL determined in S1 to the generated web page and then stores the web page into the web-page storing area 20c. Then, the CPU 14 judges in S6 whether the web page to which the URL is assigned has been stored into the web-page storing area 20c or not. Where the CPU 14 has judged that the web page to which the URL is assigned has been stored into the web-page storing area 20c (S6: Yes), the processing goes to S7. On the other hand, where the CPU 14 has judged that the web page to which the URL is assigned cannot be stored into the web-page storing area 20c (S6: No), the processing goes to S16. It is noted that the case where the web page cannot be stored into the web-page storing area 20c includes a case where there is no or not enough free space in the web-page storing area 20c, and a case where an access to the web-page storing area 20c cannot be performed, for example.

The CPU 14 converts in S7 the URL assigned to the web page to a QR code (registered trademark, hereinafter omitted), and in S8 judges whether the number of the recording sheets required for recording the entirety of the web page stored in the web-page storing area 20c is equal to or less than the maximum recording number of the setting file or not (with reference to FIG. 2). Where the CPU 14 has judged that the number of the recording sheets required for recording the entirety of the web page stored in the web-page storing area 20c is not equal to or less than the maximum recording number of the setting file (S8: No), the processing goes to S11 and subsequent steps in which the recording page(s) is or are recorded instead of the recording of the web page. On the other hand, where the CPU 14 has judged that the number of the recording sheets required for recording the entirety of the web page stored in the web-page storing area 20c is equal to or less than the maximum recording number of the setting file (S8: Yes), the processing goes to S9 and subsequent steps in which the generation of the recording page(s) is not performed, and the web page is recorded.

In S9, the CPU 14 obtains the web page from the web-page storing area 20c and adds to the web page the QR code converted in S7, i.e., the QR code indicating the URL assigned to the web page. Then, the CPU 14 records the web page to which the QR code is added, on the recording sheet(s) using the recording section 54, and the generating and recording processing is completed.

Here, there will be explained, with reference to FIGS. 4A and 4E, the recorded web page to which the QR code is added where the CPU 14 has performed the processing of S9 and display of the display portion 82 in the case where the user accesses the web page stored in the web-page storing area 20c from the CP 70 using the QR code added to the web page recorded on the recording sheets.

Figure 4C:
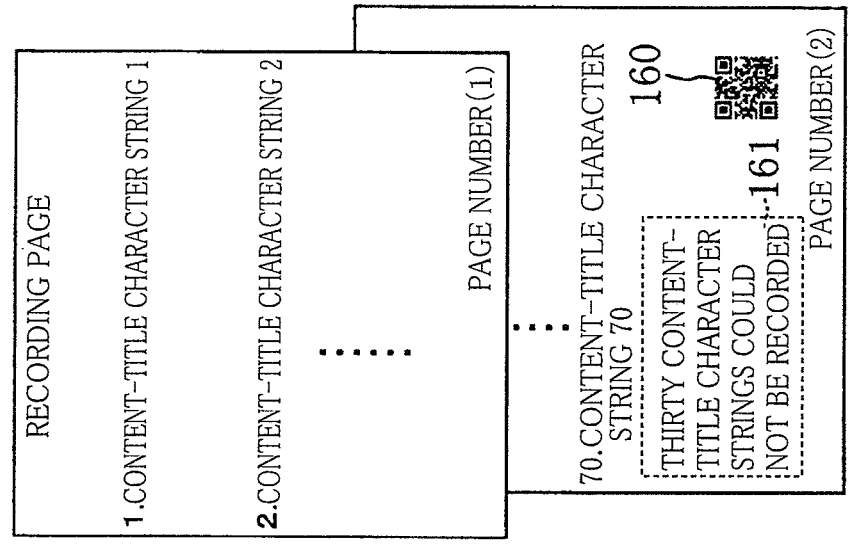
FIGS. 4A, 4B, 4C, 4D, and 4E are views showing a recorded web page, various recorded recording pages, and a web page displayed on a display portion.
Figure 4B:
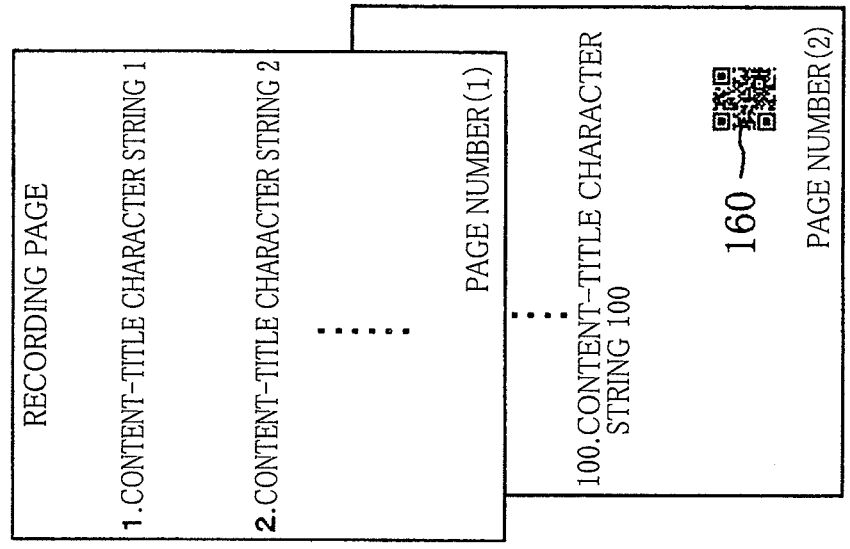
Figure 4A:
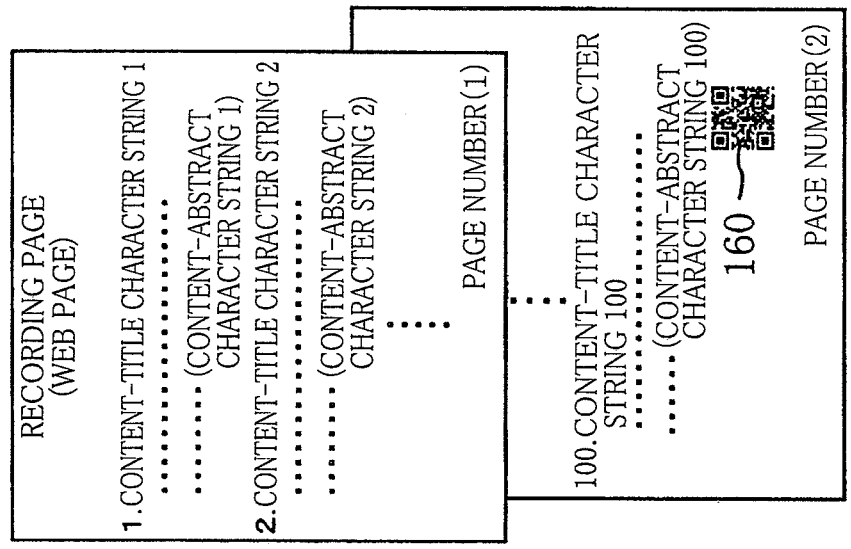
Figure 4E:
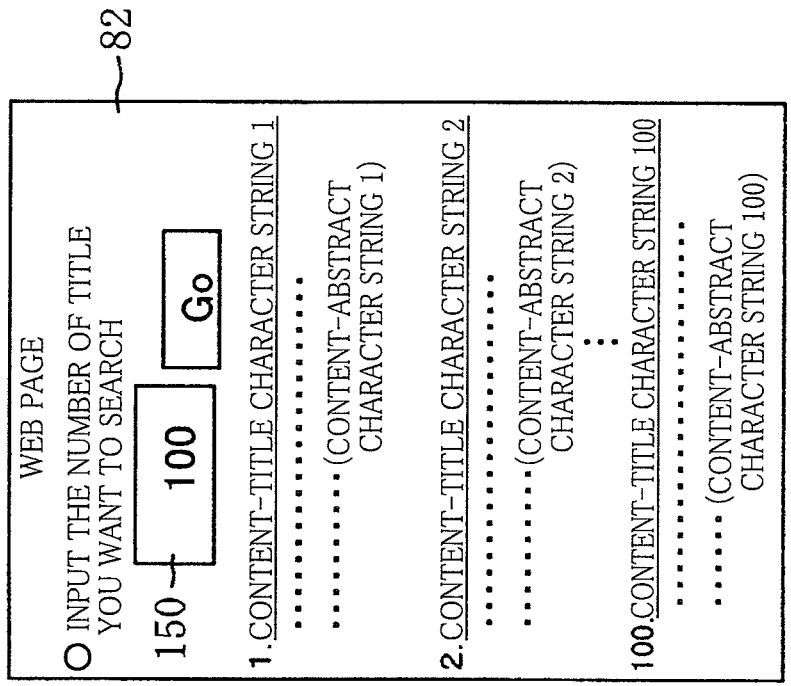

FIG. 4A is a view showing the recorded web page while FIG. 4E is a view showing the display portion 82 where the CP 70 has accessed to the web page. It is noted that FIGS. 4A and 4E respectively show the web page recorded on the recording sheets and the display of the display portion 82 where the user performing the generating and recording processing is "Ichiro" (with reference to FIG. 2).

As shown in FIG. 4A, on the recorded web page are described the content-title character strings and the content-abstract character strings corresponding to the web-page described item of the setting file (with reference to FIG. 2). Further, on this web page are described one hundred sets of information each constituted by a pair of the content-title character string and the content-abstract character string corresponding thereto, i.e., one hundred sets of information included in one set of the update-content information corresponding to the web-page describing number of the setting file (with reference to FIG. 2). Further, to a bottom portion of this web page is added a QR code 160 indicating a URL of the web page stored in the web-page storing area 20c. Thus, the CPs 70, 71 can easily access to the web page stored in the web-page storing area 20c by shooting or capturing the QR code by the integrated small-sized camera 86.

As thus described, where the number of the recording sheets required for recording the entirety of the web page stored in the web-page storing area 20c is equal to or less than the maximum recording number, the web page can be recorded on the recording sheets while suppressing the number of recording sheets to be used, and the access from the CPs 70, 71 to the web page can be facilitated.

Next, as shown in FIG. 4E, like the recorded web page, one hundred sets of information each constituted by the pair of the content-title character string and the content-abstract character string corresponding thereto are described on the web page displayed on the display portion 82. Further, to each of the content-title character strings described on the web page is linked a content URL corresponding to the content-title character string. It is noted that an underline of each content-title character string indicates that the content URL is linked. Thus, after accessing to the web page, the user of the CP 70 checks the content-title character strings, and then selects one of the content-title character strings by operating the operating portion 84, thereby easily accessing to the content corresponding to the selected content-title character string.

Further, on the web page displayed on the display portion 82, there is provided a search area 150 used where the content-title character string is speedily searched. One of numbers in ascending order respectively added to the sets of information each as a pair is inputted into the search area 150, whereby the display of the display portion 82 can be changed into display mainly displaying information having the number corresponding to the inputted number, i.e., information which the user wants to search speedily.

Returning to the explanation in FIG. 3, where the CPU 14 judges in S8 that the number of the recording sheets required for recording the entirety of the web page stored in the web-page storing area 20c is not equal to or less than the maximum recording number of the setting file (S8: No), the processing goes to S11 and the subsequent steps in which the recording page(s) on which the content-title character strings and the QR code indicating the URL of the web page are respectively described and depicted are recorded. Specifically, the CPU 14 obtains in S11 only the content-title character strings of the information written on the web page stored in the web-page storing area 20c, and generates the recording page(s). Then, in S12, the CPU 14 adds to a bottom portion of the last page of the recording pages the QR code converted in S7, i.e., the QR code indicating the URL assigned to the web page.

Then, the CPU 14 judges in S13 whether the number of the recording sheets required for recording the entirety of the generated recording page(s) is equal to or less than the maximum recording number or not (with reference to FIG. 2). Where the CPU 14 has judged that the number of the recording sheets required for recording the entirety of the recording page(s) is equal to or less than the maximum recording number (S13: Yes), the recording page(s) to which the QR code is added is or are recorded in S10 on the recording sheet(s) by the recording section 54, and the generating and recording processing is completed.

Here, there will be explained, with reference to FIG. 4B, recording pages recorded on the recording sheets where the processing in S13 is judged to be "Yes" by the CPU 14. FIG. 4B is a view showing recording pages respectively recorded on the recording sheets where the user performing the generating and recording processing is "Ichiro" (with reference to FIG. 2). It is noted that the web page stored in the web-page storing area 20c is the same as the web page explained with reference to FIG. 4E also in the case where the processing in S13 is judged to be "Yes", and an explanation of which is dispensed with.

As shown in FIG. 4B, unlike the web page stored in the web-page storing area 20c, on the recording pages are described only one hundred content-title character strings respectively corresponding to the one hundred sets of information described on the web page, that is, part of the information described on the web page is described. Here, while two recording sheets are allowed to be used for the respective recording pages corresponding to the maximum recording number of the setting file (with reference to FIG. 2), the CPU 14 has judged in S13 that the one hundred content-title character strings can be recorded using the two recording sheets (S13: Yes), and thus the one hundred content-title character strings are recorded on and within the two recording sheets. The content-title character strings recorded on the recording sheets (the content-title character strings recorded on the web page) allow the user of the MFP 10 to check a list of titles of the respective contents in a relatively large amount and in a relatively short time.

Further, the QR code 160 indicating the URL of the web page stored in the web-page storing area 20c is added to the bottom portion of the last page of the recording pages. Thus, the CPs 70, 71 can easily access to the web page stored in the web-page storing area 20c by shooting the QR code 160 with the integrated small-sized camera 86.

Returning to the explanation in FIG. 3, where the CPU 14 has judged in S13 that the number of the recording sheets required for recording the entirety of the generated recording pages is not equal to or less than the maximum recording number of the setting file (S13: No), the CPU 14 calculates in S14 the number of the content-title character strings included in one or ones of the recording pages which exceed(s) the maximum recording number (i.e., one or ones of the recording pages which is or are not within the maximum recording number), and then adds in S15 a message indicating the calculated number to the second recording sheet of the maximum recording number, i.e., one of the recording pages which is the last page of the recording pages to be recorded. Then, the recording pages to which the message and the QR code are added are recorded in S10 on the recording sheets by the recording section 54, and the generating and recording processing is completed.

Here, there will be explained, with reference to FIG. 4C, the recording pages respectively recorded on the recording sheets where the processing in S13 is judged to be "No" by the CPU 14. FIG. 4C is a view showing the recording pages respectively recorded on the recording sheets where the user performing the generating and recording processing is "Ichiro" (with reference to FIG. 2). It is noted that the web page stored in the web-page storing area 20c is the same as the web page explained with reference to FIG. 4E also in the case where the processing in S13 is judged to be "No", and the explanation of which is dispensed with.

As shown in FIG. 4C, only the content-title character strings are described on the recording pages like FIG. 4B. Here, two recording sheets are used for the recording pages in correspondence with the maximum recording number (with reference to FIG. 2). In this time, since the CPU 14 has judged that, where the two recording sheets are used, all the content-title character strings corresponding to the one hundred sets of the information described on the web page, i.e., the one hundred content-title character strings described on the generated recording pages, cannot be recorded (S13: No), recordable seventy content-title character strings are recorded on the two recording sheets. It is noted that the CPU 14 has added, to the recording sheet of the maximum recording number (i.e., the last page of the recording pages to be recorded), a message indicating the number calculated in S14, i.e., a message indicating that the number (the remaining number) of the content-title character strings included in one or ones of the recording pages which exceed two as the maximum recording number is thirty, and thus a message 161 saying "thirty content-title character strings could not be recorded" is recorded on a lower portion of the second recording page. Thus, even where the recording pages are recorded in a state in which the number of the recording sheets is limited to the maximum recording number, the user of the MFP 10 can grasp the number of all the content-title character strings described on the web page from the number of the content-title character strings recorded on the recording sheets and the remaining number of the content-title character strings.

It is noted that, like the case shown in FIG. 4B, the QR code 160 indicating the URL of the web page stored in the web-page storing area 20c is added to the bottom portion of the last page of the recording pages.

Returning to the explanation of FIG. 3, where the CPU 14 has judged in S6 that the web page to which the URL is assigned cannot be stored into the web-page storing area 20c (S6: No), the processing goes to S16 and subsequent steps in which the content-title character strings and QR codes indicating content URLs respectively corresponding to the content-title character strings are recorded instead of the recording of the web page and the recording of the recording pages generated in S11-S15 (i.e., the recording pages on which the content-title character strings and the QR code indicating the URL of the web page are described). Specifically, in S16, the CPU 14 obtains the content-title character strings recorded on the web page generated in S4 and generates the recording pages. Then, in S17, the CPU 14 obtains from the update-content information the content URLs respectively corresponding to the content-title character strings described on the generated recording pages.

Then, the CPU 14 converts in S18 the obtained content URLs respectively to the QR codes, and assigns and adds in S19 the QR codes respectively to the content-title character strings described on the recording pages. As a result of the processing of S19, the QR codes respectively indicating the content URLs corresponding to the respective content-title character strings are respectively described on the recording pages in addition to the content-title character strings instead of the QR code 160 indicating the URL of the web page. Then, in S10, the recording pages on which the content-title character strings and the QR codes are described are recorded on the recording sheets by the recording section 54, and the generating and recording processing is completed.

Figure 4D:
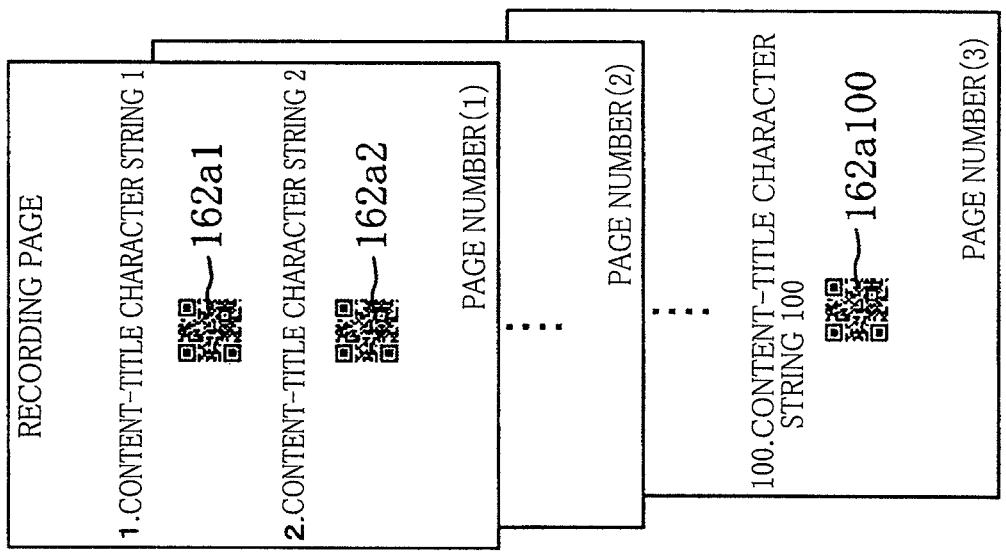

Here, there will be explained, with reference to FIG. 4D, the recording pages respectively recorded on the recording sheets where the processing in S6 is judged to be "No" by the CPU 14. FIG. 4D is a view showing the recording pages respectively recorded on the recording sheets where the user performing the generating and recording processing is "Ichiro" (with reference to FIG. 2). It is noted that where the processing in S6 is judged to be "No" by the CPU 14, the web page is not stored into the web-page storing area 20c. Thus, in this case, the user is not allowed to access to the web page shown in FIG. 4E from the CPs 70, 71.

As shown in FIG. 4D, like the case in FIG. 4B, only the content-title character strings are described on the recording pages. Here, while the maximum recording number of the setting file is two (with reference to FIG. 2), three recording sheets are actually used for the recording pages. This is because, since the user cannot check the one hundred content-title character strings by accessing to the web page from the CPs 70, 71, the CPU 14 records in S10 the recording pages on the number of recording sheets which allows the recording of the one hundred content-title character strings regardless of the maximum recording number of the setting file.

As shown in FIG. 4D, the QR codes 162a1-162a100 respectively indicating the content URLs corresponding to the respective content-title character strings are respectively described for all the content-title character strings described on the recording pages instead of the QR code 160 indicating the URL of the web page. Thus, even where the generated web page is not stored into the web-page storing area 20c, and the user is not allowed to access to the web page from the CPs 70, 71, the user can easily access to the content from the CPs 70, 71 by shooting the QR codes 162a1-162a100 described on the recording pages or recorded on the recording sheets with the integrated small-sized camera 86.

As described above, a time for checking the information described on the web page using the CPs 70, 71 is normally shorter than a time for checking the same information as the information described on the web page by scrolling on the display panel 50 or a time for checking the information by displaying part of the information in the fixed display on the display panel 50 and successively changing the fixed display. Further, an amount in which the information described on the web page can be checked in a unit or a specific time is normally larger by checking using the CPs 70, 71 than using the display panel 50. Thus, according to this MFP system 2, the user accesses to the web page stored in the web-page storing area 20c from the CPs 70, 71, thereby checking the information described on the web page, i.e., the content-title character strings and so on generated on the basis of the setting file stored in the user-setting storing area 20b in a relatively large amount and in a relatively short time.

Further, like the case of the information described on the web page, a time in which the user of the MFP 10 checks the content-title character strings described on the recording pages recorded on the recording sheets is shorter than a time in which the user checks the same content-title character strings using the display panel 50. Further, an amount of the content-title character strings that can be checked in the unit time is normally larger by checking using the recording sheets than using the display panel 50. Thus, the user checks the recording pages recorded on the recording sheets, thereby checking the content-title character strings of the information described on the web page in a relatively large amount and in a relatively short time.

Further, according to this MFP system 2, up to three sets of information, i.e., the content-title character string, the content-updated date and time information, and the content-abstract character string of the information included in the update-content information can be set as the information described on the web page. On the other hand, the information described on the recording pages is only the content-title character string of the update-content information. Thus, the amount of the information described on the web page is greater than that of the information described on the recording pages. Accordingly, the user accesses to the web page from the CPs 70, 71, thereby checking information having the amount greater than that of the information described on the recording pages, and suppressing the number of the recording sheets used for the recording of the recording pages by suppressing the information amount of the information described on the recording pages.

There will be next explained a modification of the above-described embodiment of the present invention. In the above-described embodiment, fields of the user name, the content distribution server name, the web-page described item, the web-page describing number, and the maximum recording number are provided in the setting file stored in the user-setting storing area 20b. In the present modification, the setting file stored in the user-setting storing area 20b is set as shown in FIG. 5. As shown in FIG. 5, the setting file stored in the user-setting storing area 20b includes the user name, the content distribution server name, the web-page described item, the web-page describing number, a recording-page described item which is an item or items described on the recording page, a recording-page describing number which is a maximum describing number of the recording page, a maximum recording number (web page) which is a maximum recording number of the web page, and a maximum recording number (recording page) which is a maximum recording number of the recording page. Further, a "content-title character string" is set as the recording-page described item for the user name "Ichiro" while a "content-title character string", a "content-abstract character string", and a "content-updated date and time information" are set as the recording-page described item for the user name "Hanako". Likewise, "50" is set as the recording-page describing number for the user name "Ichiro", while "50" is set as the recording-page describing number for the user name "Hanako". Further, "3" and "2" are respectively set as the maximum recording number (web page) and the maximum recording number (recording page) for the user name "Ichiro", while "2" and "2" are respectively set as the maximum recording number (web page) and the maximum recording number (recording page) for the user name "Hanako".

In the present modification as described above, since the field of the recording-page described item is provided in the setting file stored in the user-setting storing area 20*b*, the information described on the recording pages can be freely set, whereby the recording pages are formed as desired by the user. In this case, for example, only the content-abstract character strings can be described on the recording pages, or only the content-updated date and time information can be described on the recording pages. It is noted that, even where only the content-updated date and time information is described on the recording pages, the user can easily judge which information of the web page the content-updated date and time information described on the recording pages corresponds to by the number in ascending order which is assigned commonly to the web page and the recording pages. Further, since the field of the recording-page describing number is provided in the setting file, the number of the recording sheets used for the recording of the recording pages can be adjusted. Further, since the recording-page describing number can be adjusted separately from and independently of the web-page describing number, the recording pages can be formed as desired by the user. For example, where the describing number of the web page on which the content-title character strings and the content-abstract character strings are described is set to one hundred, the user can recognize information of each content. On the other hand, where the describing number of the recording pages on which the content-title character strings and the content-abstract character strings are described is set to fifty, the number of the recording sheets can be made smaller compared with the case in which the web page is recorded. This case is especially preferable where the user wants to know a title of a higher-ranked content and make the number of the recordings smaller. For example, where the contents of the web page are described in descending order of the updated date and time, the case is preferable when the user wants to know a title of a new content. Further, where the contents of the web page are described in descending order of the number of access, the case is preferable when the user wants to know a title of a high-ranked content with regard to the access. Further, since the maximum recording number (web page) and the maximum recording number (recording page) are changed independently of each other according to a demand of the user, the respective numbers of the web pages and the recording pages are made as desired by the user.

While the embodiment of the present invention has been described above, it is to be understood that the invention is not limited to the details of the illustrated embodiment, but may be embodied with various changes and modifications, which may occur to those skilled in the art, without departing from the spirit and scope of the invention.

In the present embodiment, the MFP 10 describes only the content-title character strings on the recording pages, but the MFP 10 is not limited to this configuration. That is, in addition to the content-title character strings, the content-updated date and time information corresponding to the content-title character strings may be described on the recording pages, for example. In this case, the amount of the information described on the recording pages can be increased.

Further, in the present embodiment, in the generating and recording processing shown in FIG. 3, after the URL determined in S1 is assigned to the web page generated in S4, the web page is stored into the web-page storing area 20*c* in S5, but this MFP 10 is not limited to this configuration. That is, the web page generated in S4 is stored into the web-page storing area 20*c*, and then the URL determined in S1 may be assigned to the stored web page. Where the MFP 10 is thus configured, the URL can be assigned only to the web page stored in the web-page storing area 20*c*, i.e., only to the web page to which the user can access from the CPs 70, 71. Thus, it can be prevented that the web page to which the URL determined in S1 is assigned cannot be stored into the web-page storing area 20*c*, and the URL becomes useless.

Further, in the present embodiment, the web-page storing area 20*c* storing the web page is provided on the NVRAM 20, but the MFP 10 is not limited to this configuration. That is, where a volume of the web page is expected to become relatively large, the MFP 10 may be configured such that a hard disc is provided in the MFP 10, and the web-page storing area 20*c* is provided in the hard disc. Further, the web-page storing area 20*c* may be provided in an external server connected to the internet 8. In this case, a storage capacity of the MFP 10 can be reduced.

Further, in the present embodiment, each of the contents distribution servers 90, 91 stores both of the content and the feeding information, but the system 2 is not limited to this configuration. That is, a server for storing the content and a server for storing the feeding information may be configured separately from each other.

Further, in the present embodiment, the generating and recording processing shown in FIG. 3 is performed by the CPU 14 of the MFP 10, but the MFP 10 is not limited to this configuration. That is, the MFP 10 may be configured such that the processings of the generating and recording processing shown in FIG. 3 except for the processing of S10 are performed by a controlling device, e.g., a personal computer, connected to the MFP 10 so as to be communicated with each other, and then the controlling device outputs a recording command to the MFP 10. Also, the MFP 10 may be configured such that the MFP 10 having received the recording command performs the processing of S10. In this case, since the MFP 10 performs only the processing of S10, a load of the processing of the MFP 10 can be reduced.

Further, in the present embodiment, in the generating and recording processing shown in FIG. 3, where the web page can be recorded in the number equal to or less than the maximum recording-page number (S8: Yes), the recording pages are not generated, but the MFP 10 is not limited to this configuration. That is, the MFP 10 may be configured such that, even where the processing in S8 is judged to be "Yes", the recording pages are generated. However, in this case, though the recording pages are generated, the generated recording pages are not recorded, and the web page is recorded instead of the recording of the recording pages.

Further, in the present embodiment, as shown in FIG. 4C, to the recording pages is added the message 161 indicating the number of the descriptions of the content-title character strings included in the recording pages which exceed the maximum recording-page number, but the MFP 10 is not limited to this configuration. That is, the message added to the recording pages may be a message in which the number of the description is not shown and which is for saying that there are the content-title character strings included in the recording pages exceeding the maximum recording-page number. For example, "there are content-title character strings which could not be recorded" is written as the message. In this case, the processing of calculating the number, specifically, the processings of S14 and S15 shown in FIG. 3 can be simplified.

Further, in the present embodiment, as shown in FIG. 4C, to the last page of the recording pages to be recorded is added the message 161 indicating the number of the descriptions of the content-title character strings included in the recording pages which exceed the maximum recording-page number, but the MFP 10 is not limited to this configuration. That is, the above-described message may be added to a first page of the recording pages to be recorded or all the pages to be recorded.

Further, in the present embodiment, where the CPU 14 has judged that the web page to which the URL is assigned cannot be stored into the web-page storing area 20c (S6: No), in addition to the content-title character strings, the QR codes 162a1-162a100 respectively indicating the content URLs corresponding to the respective content-title character strings are described on the recording pages instead of the QR code 160 indicating the URL of the web page, but the MFP 10 is not limited to this configuration. That is, though the user is not allowed to access to the web page, the QR code 160 indicating the URL assigned to the web page may be described on the one of the recording pages in addition to the QR codes 162a1-162a100 respectively indicating the content-title character strings and the content URLs.

It is noted that, in the above-described embodiment, the generating and recording processing for generating the web page and the recording pages is performed where the generation of the web page and the recording pages is commanded by the operation of the user, but the MFP 10 is not limited to this configuration. For example, even where the generation of the web page and the recording pages is not commanded by the user, the MFP 10 may be configured so as to automatically generate the web page and the recording pages at predetermined time intervals, e.g., 10 minutes intervals. Where the MFP 10 is thus configured, since the web page and the recording pages have already been generated before the user commands the generation, a time period to complete the recording of the web page and the recording pages can be maden shorter, so that the user views the web page or the recording pages recorded on the recording sheet in a relatively short time.

Further, in the above-described embodiment, the recording pages are formed in S11 by extraction of the information from the information described on the web page stored in the web-page storing area 20c, but the MFP 10 is not limited to this configuration. For example, the MFP 10 may be configured such that the information used for generating the recording pages for a certain user is obtained from the display-information storing area 18a to generate the recording pages, and the generated recording pages are stored into a recording-page storing area provided in the controller 12. Where the MFP 10 is thus configured, an item other than the item(s) described on the web page can be described on the recording pages, and the number more than the number of the titles of the contents described on the web page can be described on the recording pages, whereby the recording pages can be made as desired by the user. In this case, the MFP 10 may be configured such that, where the user wants to access to a URL of a title of the content which is not described on the web page, the user can access to the content from the CPs 71, 72 by, e.g., inputting the number into the search area 150 shown in FIG. 4E.

Further, in the above-described embodiment, the URL assigned to the web page is converted to the QR code to describe the QR code on the recording page, but the MFP 10 is not limited to this configuration. For example, the MFP 10 may be configured such that the URL assigned to the web page is not converted to the QR code but described on the recording page. In this case, the user referring to the recording pages can have the web page displayed by inputting the URL to the CP 70, for example.

What is claimed is:
1. A communication apparatus comprising:
a Uniform Resource Locator (URL) storing portion configured to store a URL of content-related information as a content-related-information URL into a memory, the content-related information including at least a URL of a content as a content URL and title information of the content;
a content-related-information obtaining portion to be executed by a processor to control a processor to obtain the content-related information by using the content-related-information URL stored by the URL storing portion;
a web-page generating portion to be executed by the processor to generate, using the content-related information obtained by the content-related-information obtaining portion, a web page including at least the content URL and the title information;
an assigning portion to be executed by the processor to determine a web page URL that is different from the content-related-information URL and the content URL and to assign the determined web page URL to the web page generated by the web-page generating portion;
a web-page storing portion to be executed by a processor to have a storage device store the generated web page to which the determined web page URL is assigned, the storage device being accessible from an external device;
a recording-page generating portion to be executed by the processor to generate a recording page on which at least the title information is described;
a web-page information adding portion to be executed by the processor to add web-page information that represents the web page URL assigned to the web page by the assigning portion, to the recording page generated by the recording-page generating portion, such that the web-page information is described on the recording page; and
a recording controller configured to control a recording section to record, on a recording medium, the recording page on which the web-page information is described,
wherein an amount of information to be described contained in the content-related information is greater than an amount of information to be described contained in the web page generated using the content-related information.

2. The communication apparatus according to claim 1, further comprising:
a display portion configured to display information included in the content-related information obtained by the content-related-information obtaining portion; and
a receiving portion configured to receive a recording command for recording the information displayed on the display portion,
wherein the web-page generating portion is configured to generate the web page when the receiving portion receives the recording command.

3. The communication apparatus according to claim 1, wherein the amount of the information to be described that is contained in the web page is greater than an amount of information to be described that is contained in the recording page.

4. The communication apparatus according to claim 1, wherein the web-page information adding portion is a first web-page information adding portion, and the recording controller is a first recording controller, and
wherein the communication apparatus further comprises:
a recording judging portion configured to judge whether a number of recording media required for recording an entirety of the web page generated by the web-page generating portion is equal to or less than a predetermined number of the recording media or not;
a second web-page information adding portion configured to add the web-page information to the web page by the assigning portion when the recording judging portion judges that the number of the recording media required for recording the entirety of the web page is equal to or less than the predetermined number of the recording media; and
a second recording controller configured to control the recording section to record the web page to which the web-page information is added by the second web-page information adding portion.

5. The communication apparatus according to claim 4, wherein the web page includes abstract information of the content in addition to the content URL and the title information.

6. The communication apparatus according to claim 4, wherein the recording-page generating portion is configured not to generate the recording page when the recording judging portion judges that the number of the recording media required for recording the entirety of the web page is equal to or less than the predetermined number of the recording media.

7. The communication apparatus according to claim 4, wherein the recording judging portion is a first recording judging portion, and
wherein the communication apparatus further comprises:
a second recording judging portion configured to judge whether the number of recording media required for recording an entirety of the recording page generated by the recording-page generating portion is equal to or less than the predetermined number of the recording media when the first recording judging portion judges that the number of recording media required for recording the entirety of the web page is not equal to or less than the predetermined number of the recording media or not;
a message adding portion configured to add, to the recording page, a message indicating that information whose amount is greater than an amount corresponding to the predetermined number of the recording media exists in the recording page, when the second recording judging portion judges that the number of recording media required for recording the entirety of the recording page is not equal to or less than the predetermined number; and
a third recording controller configured to control the recording section instead of the second recording controller such that the recording section records, on the predetermined number of the recording media, the recording page to which the message is added, when the second recording judging portion judges that the number of recording media required for recording the entirety of the recording page is not equal to or less than the predetermined number.

8. The communication apparatus according to claim 7, wherein the recording page contains the web page URL, the message, and a list of titles of a plurality of contents as the title information, and does not contain a plurality of abstracts of the respective contents and a plurality of content URLs of the respective contents.

9. The communication apparatus according to claim 1, wherein the communication apparatus further comprising:
a detecting portion configured to detect that the web page generated by the web-page generating portion cannot be stored into the storage device;
a second web-page information adding portion configured to add, to the recording page, information representing a content URL corresponding to the title information of the content which is described on the recording page, when the detecting portion detects that the web page cannot be stored; and
a fourth recording controller configured to control the recording section to record, on the recording medium, the recording page to which the information representing the content URL is added by the second web-page information adding portion.

10. The communication apparatus according to claim 1, further comprising an information setting portion configured to be allowed to set information about the content-related information used for the generation of the web page by the web-page generating portion,
wherein the web-page generating portion is configured to generate the web page on the basis of the information set by the information setting portion.

11. The communication apparatus according to claim 10, wherein the information setting portion is allowed to set information for specifying a server which provides the content.

12. The communication apparatus according to claim 10, wherein the information setting portion is allowed to set information described on the web page.

13. The communication apparatus according to claim 10, wherein the information setting portion is allowed to set a maximum amount of the information to be described on the web page.

14. The communication apparatus according to claim 10, further comprising a recording-medium number setting portion configured to allow a predetermined number of the recording media to be set.

15. The communication apparatus according to claim 10, wherein the information setting portion is configured to be allowed to set information relating to the content-related information used for the generation of the recording page by the recording-page generating portion, and
wherein the recording-page generating portion is configured to generate the recording page on the basis of the information set by the information setting portion.

16. The communication apparatus according to claim 1, wherein the web-page information is in the form of a two-dimensional code.

17. The communication apparatus according to claim 1, wherein the web page contains the web page URL, a list of titles of a plurality of contents as the title information, and a plurality of abstracts of the respective contents.

18. The communication apparatus according to claim 17, wherein the recording page contains the web page URL and the list of titles of the plurality of contents as the title information, and does not contain the plurality of abstracts of the respective contents and a plurality of content URLs of the respective contents.

19. The communication apparatus according to claim 17, wherein the recording page contains the list of titles of the plurality of contents as the title information, and a plurality of content URLs of the respective contents, and does not contain the plurality of abstracts of the respective contents.

20. The communication apparatus according to claim 1, wherein the content-related information is in Rich Site Summary (RSS) format.

21. A non-transitory computer readable storage medium storing a program executed by a communication apparatus, the program comprising:

obtaining content-related information by using a content-related-information Uniform Resource Locator (URL) stored in a URL storing portion;

generating, by using the content-related information, a web page including at least a content URL and title information;

determining a web page URL that is different from the content-related-information URL and the content URL and assigning the determined web page URL to the web page;

having a storage device store the generated web page to which the determined web page URL is assigned, the storage device being accessible from an external device;

generating a recording page on which at least the title information is described;

adding web-page information that represents the web page URL to the recording page, such that the web-page information is described on the recording page; and controlling a recording section to record, on a recording medium, the recording page on which the web-page information is described, wherein an amount of information to be described which is contained in the content-related information is greater than an amount of information to be described which is contained in the web page generated using the content-related information.

* * * * *